Jan. 21, 1964     H. E. THOMPSON     3,118,309

MECHANICAL POSITIONING MECHANISM

Filed Dec. 23, 1960

*INVENTOR.*
HERBERT E. THOMPSON

BY

ATTORNEY

United States Patent Office 3,118,309
Patented Jan. 21, 1964

3,118,309
MECHANICAL POSITIONING MECHANISM
Herbert E. Thompson, San Jose, Calif., assignor to International Business Machines Corporation, New York, N.Y., a corporation of New York
Filed Dec. 23, 1960, Ser. No. 77,871
9 Claims. (Cl. 74—99)

The present invention relates to a mechanical positioning mechanism and more particularly to a mechanical actuating drive for positioning a device at a selected discrete position within a predetermined range of positions.

The present invention contemplates an actuating drive in the form of a mechanical numeric adder which employs a plurality of linear-to-rotary motion generators. In the present invention a plurality of shafts are mounted in a frame for both rotary and axial movement. Separate means is provided for imparting an axial thrust to each shaft. A linear-to-rotary motion generator is mounted on each shaft and the generators are coded in accordance with a preselected numeric code. The generators are connected in series to transmit rotary motion through the train of generators and provide an output which is equal to the sum of the inputs to the individual generators. The mechanism of the present invention is operated by imparting an axial thrust to selected shafts to actuate the selected linear-to-rotary motion generators required to produce the desired output.

The object of the present invention is to provide a mechanical numeric adder for use as an actuating drive which is inexpensive and easy to manufacture.

Other objects and many of the attendant advantages of this invention will be readily appreciated as the same becomes better understood by reference to the following detailed description when considered in connection with the accompanying drawing wherein.

Figure 1:
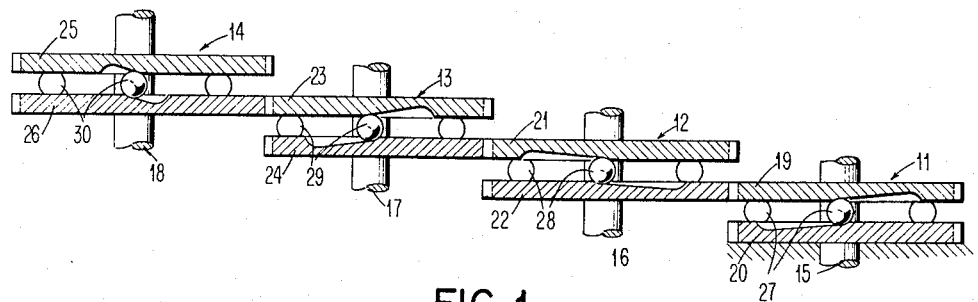
FIG. 1 is a schematic view of the mechanism of the present invention.

Referring more particularly to FIG. 1 of the drawing, the present invention is illustrated as including a plurality of linear-to-rotary motion generators 11-14, each of which is mounted on a shaft 15-18. Each motion generator is made up of a pair of gears 19-26. The gears of each pair are separated by a series of balls 27-30 which act as the means of transmitting rotary motion between the gears whenever one gear is moved toward or away from the other. The balls ride in arcuate inclined channels formed in the opposing surfaces of each pair of gears. A gear of each motion generator meshes in driving connection with a gear of an adjacent motion generator to form a gear train for the transmission of rotary motion. The initial drive for each motion generator is supplied by an axial thrust through shafts 15-18 delivered by any suitable means 55-58, such as a solenoid or an hydraulic or pneumatic cylinder, etc.

Figure 2:
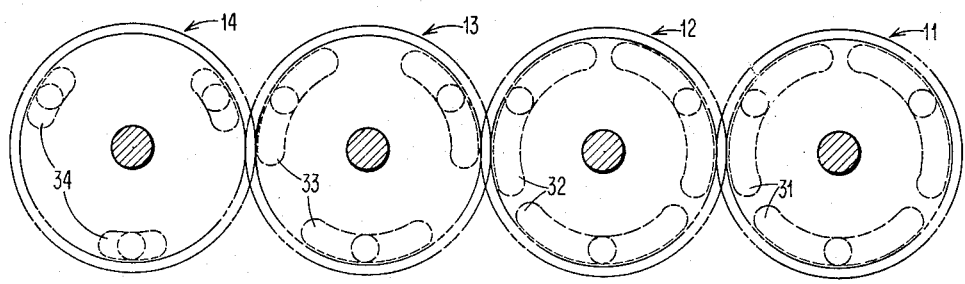
FIG. 2 is a plan view of the device of FIG. 1.

As shown in FIG. 2 there are three or more balls separating each pair of gears and each ball rides in an arcuate channel 31-34. The channels in each motion generator are of equal length and equidistant from the center of rotation of the generator and are spaced apart on centers approximately 120 degrees. The arcuate channels 31-34 of the respective motion generators are of various lengths depending upon the amount of movement needed to correspond to a numeric output of the mechanism. In general, the arc lengths could be of any code so that the output would be the sum of the various lengths, however, by way of example, motion generators 11-14 are coded 3, 3, 2 and 1 respectively. That is, motion generators 11 and 12 will produce three increments of movement, motion generator 13 will produce two increments, and motion generator 14 will produce one increment of movement.

Figure 3:
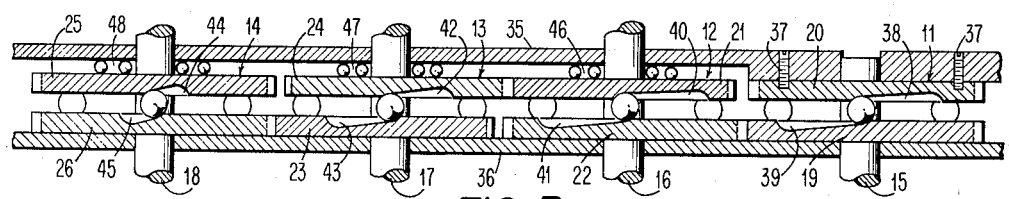
FIG. 3 is an elevation view of a preferred embodiment of the present invention in partial section.

Referring to FIG. 3, a practical embodiment of the present invention is illustrated as including upper and lower frame members 35 and 36 spaced a short distance apart. Shafts 15-18 are mounted in the frame members for both rotary and axial movement. Motion generators 11-14 are mounted on the respective shafts between the frame members. In this connection, it should be noted that motion generators 11 and 13 are reversed from the position shown in FIG. 1 so that all four motion generators lie in a common plane. To facilitate positioning the motion generators in a common plane, portions of gears 21, 23 and 24 have been removed to prevent meshing with gears 20, 22 and 25 respectively. The lower gears 19, 22, 23 and 26 are each connected with their respective shaft for the transmission of axial motion from the shaft to the gear. This connection may be by means of a collar (not shown) or other protrusion on the shaft abutting the lower surface of the gear. The upper gears 21 and 24 are loosely mounted on shafts 16 and 17 allowing the shafts to reciprocate freely along their axes in a vertical direction and allowing these gears to rotate independently of the shafts. Gear 25 is connected to shaft 18 as by a spline or pin to transmit rotary motion from the gear to the shaft. Gear 20 is stationary, being attached to the upper frame 35 by bolts or screws 37 to serve as the initial thrust point when the gear train is in motion. The annular channels 31-34 are formed by pairs of aligned, arcuate, oppositely inclined grooves 38-45 in the opposing surfaces of each pair of gears. In the rest condition of each motion generator, the gears are maintained in such rotational or angular position relative to each other that the shallow portions of each pair of grooves are in overlapping relation with a ball disposed therebetween. In such position, the balls form a driving connection between the gears of each pair to prevent relative rotation therebetween in one direction. The balls 27-30 riding in the grooves 38-45 produce the rotational drive of gears 19 and 21-26 through the upward thrust of the shafts. Thrust bearings 46, 47 and 48 are provided between the inner surface of the upper frame member and the outer surface of the upper gears 21, 24 and 25 to facilitate the rotation of these gears. The lower frame member maintains the lower gears in position relative to the upper gears, hence, retaining the balls in their respective channels.

Figure 4:
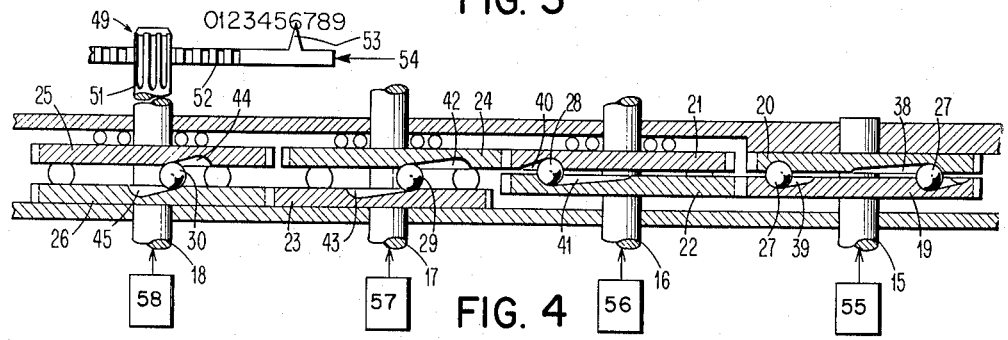
FIG. 4 is an elevation view of the device of FIG. 3 activated to produce an output.

Referring to FIG. 4, the mechanism of the present invention is illustrated as including an output device 49 coupled to shaft 18. As shown the output includes a gear 51 which meshes with a rack 52. The rack is provided with a pointer 53 adapted to travel horizontally across a chart of numbers. A return bias 54 is coupled to the rack 52. The bias can be any suitable means, such as a spring, pneumatic or hydraulic cylinder, an electric solenoid, or etc., for resetting the mechanism to the rest or reset position such as shown in FIG. 3. Either the gear 51 or the rack 52 can be used as the power takeoff for the device being driven by the mechanism of the present invention.

In the operation of the present invention the adder is activated by applying an axial thrust to one or more of the shafts 15-18. By way of illustration, FIG. 4 shows the adder activated to produce a sum or answer at the output on the chart which is "six," the sum of 3 and 3 added together. The sequence of operation and succession of movements is as follows: means 55 is energized to force shaft 15 upward. Shaft 15, being attached to gear 19, forces the gear to rotate counterclockwise and upward at the same time toward gear 20, through the effect of the balls 27 and the arcuate inclined plane in the channels 31. Linear and rotary motion stop when the balls 27 bottom at the deep ends of the grooves 38 and 39. While gear 19 is moving, gear 22, which meshes with gear 19, is rotated in a clockwise direction. Balls 28 being at the shallow ends of grooves 40 and 41 transmit the rotary motion of gear 22 to gear 21 so that motion generator 12 rotates as a unit. Motion generators 13 and 14 similarly each rotate as a unit in one direction, i.e., generator 13 counterclockwise and generator 14 clockwise. The rotation of gear 19 is thus transmitted through motion generators 12, 13 and 14 to the output 49. Means 56 is then energized and a thrust is applied to gear 22 through shaft 16. Since gear 22 is meshed with gear 19 and can no longer rotate, it can only slide upward forcing the balls 28 to travel down the inclined plane of channels 32, thus pulling gear 21 in a clockwise direction. The rotation of gear 21 and the upward movement of gear 22 stops when the balls 28 bottom in the deep ends of the grooves 40 and 41. The rotational motion of gear 21 is transmitted to motion generator 13 through gear 24 and then to generator 14 and the output 49. The output indicates the combined effect of the individual movements of gears 19 and 21 to provide an output of six units as shown. To move the pointer 53 to the number "eight" and provide an output of that amount, means 57 would be energized to apply a thrust to shaft 17. Axial movement of shaft 17 would force the gear 23 upward and in a counterclockwise direction until the balls 29 bottom in the deep ends of the grooves 42 and 43 which would terminate the linear and rotary motion. To return to the number "four," means 56 and 57 would be de-energized so that the thrust on shafts 16 and 17 would be taken off and the bias force would return the pointer to position "three." Means 58 would be energized and thrust would then be applied to shaft 18 which would force the gear 26 upwardly, rotating gear 25 in a clockwise direction until the balls 30 bottom in the deep ends of the grooves 44 and 45. Shaft 18 and output 49 would be rotated by gear 25 to align the pointer 53 with number "four." Since shafts 15 and 18 are engaged, the output would be "four," i.e., the sum of 3 and 1.

Because of the constant return bias, the adder of the present invention need not be reset to rest position before starting a new sequence of adding. While the various means 55–58 have been described as energized in sequence for ease in understanding the operation of the mechanism disclosed, it is understood that the motion generators can be activated sequentially or simultaneously as desired.

The present invention can be calibrated by adjustment of the position of gear 20. By repositioning gear 20, shaft 18 can be adjusted to the proper position to achieve correct alignment of the pointer 53 and the chart of numbers.

The positioning mechanism of the present invention has been illustrated as employing a numeric code. However, it is contemplated that the motion generators could be coded according to any suitable code, for instance, logarithmic. If the channels 31–34 were coded in terms of logarithmic functions of increments the mechanism disclosed could be used for multiplication of the increments instead of addition.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A mechanical positioning mechanism comprising: a plurality of linear-to-rotary motion generators connected in series to form a train for the transmission of rotary motion therethrough, the generators being coded in accordance with a preselected numeric code to produce a numeric output; and a plurality of shafts, each shaft being connected to a motion generator for applying linear motion thereto.

2. A mechanical positioning mechanism as defined in claim 1 in which each motion generator includes a pair of gears, at least one gear of each generator being meshed with a gear of an adjacent generator.

3. A mechanical positioning mechanism as defined in claim 2 in which the gears of each generator are spaced apart by balls which provide a driving connection between the gears.

4. A mechanical positioning mechanism comprising: upper and lower frame members; a plurality of shafts mounted in the frame members for rotary and axial movement; and a plurality of linear-to-rotary motion generators mounted on the shafts between the frame members, the motion generators being connected in series to form a train for the transmission of rotary motion.

5. A mechanical positioning mechanism as defined in claim 4 in which each motion generator includes a pair of gears, at least one gear of each generator being meshed with a gear of an adjacent generator.

6. A mechanical positioning mechanism as defined in claim 5 in which the gears of each generator are spaced apart by balls which provide a driving connection between the gears.

7. A mechanical positioning mechanism as defined in claim 6 in which one gear of one motion generator is secured to the frame, and one gear of another motion generator is secured to an output shaft.

8. A mechanical positioning mechanism comprising: upper and lower frame members; a plurality of shafts mounted in the frame members for rotary and axial movement; a plurality of linear-to-rotary motion generators mounted on the shafts between the frame members, the shafts being connected to the motion generators for the transmission of linear motion thereto, the motion generators being connected in series to form a train for the transmission of rotary motion; and an output device connected to one of the motion generators, the output of the mechanism being the sum of the rotary movements of the individual motion generators.

9. A mechanical positioning mechanism as defined in claim 8 in which the motion generators are coded according to a numeric code to provide rotational movements equal to multiples of an increment of movement.

References Cited in the file of this patent

UNITED STATES PATENTS

| | | |
|---|---|---|
| 598,266 | Mallmann | Feb. 1, 1898 |
| 701,721 | Harrison | June 3, 1902 |
| 2,539,090 | Leland | Jan. 23, 1951 |
| 2,544,918 | Demevlenaere et al. | Mar. 13, 1951 |
| 2,828,636 | Hall | Apr. 1, 1958 |